United States Patent [19]
Azegami et al.

[11] Patent Number: 5,995,764
[45] Date of Patent: Nov. 30, 1999

[54] BRUSH MOUNTING STRUCTURE FOR ENCODER AND FOCAL LENGTH DETECTION MECHANISM IN A ZOOM LENS BARREL

[75] Inventors: Kazuyoshi Azegami, Tokyo; Takamitsu Sasaki, Saitama; Kazunori Ishizuka, Kanagawa; Hiroshi Nomura, Saitama, all of Japan

[73] Assignee: Asahi Kogaku Kogyo Kabushiki Kaisha, Tokyo, Japan

[21] Appl. No.: 09/176,964

[22] Filed: Oct. 22, 1998

[30] Foreign Application Priority Data

Oct. 24, 1997 [JP] Japan ..................... 9-292577
Oct. 24, 1997 [JP] Japan ..................... 9-292578

[51] Int. Cl.$^6$ ................................ G03B 17/00
[52] U.S. Cl. ........................................... 396/87
[58] Field of Search .................... 396/72, 87, 542; 359/696, 697, 698

[56] References Cited

U.S. PATENT DOCUMENTS

| 4,596,449 | 6/1986 | Iwata et al. ...................... 359/697 |
| 5,291,232 | 3/1994 | Kobayashi et al. ............... 396/87 |
| 5,543,971 | 8/1996 | Nomura et al. ................... 359/697 |
| 5,809,348 | 9/1998 | Nomura et al. ................... 396/72 |
| 5,809,361 | 9/1998 | Nomura et al. ................... 396/72 X |

Primary Examiner—W. B. Perkey
Attorney, Agent, or Firm—Greenblum & Bernstein, P.L.C.

[57] ABSTRACT

A brush mounting structure for an encoder in a zoom lens barrel includes a code plate and a brush operatively arranged in a zoom lens barrel which constitute an encoder which detects the focal length in accordance with a relative sliding movement between the code plate and the brush; and a helicoid lens barrel member which is provided with a helicoid portion and which constitutes the zoom lens barrel. The brush is provided on the helicoid portion of the helicoid lens barrel. A focal length detection circuit in the zoom lens barrel is also disclosed.

11 Claims, 7 Drawing Sheets

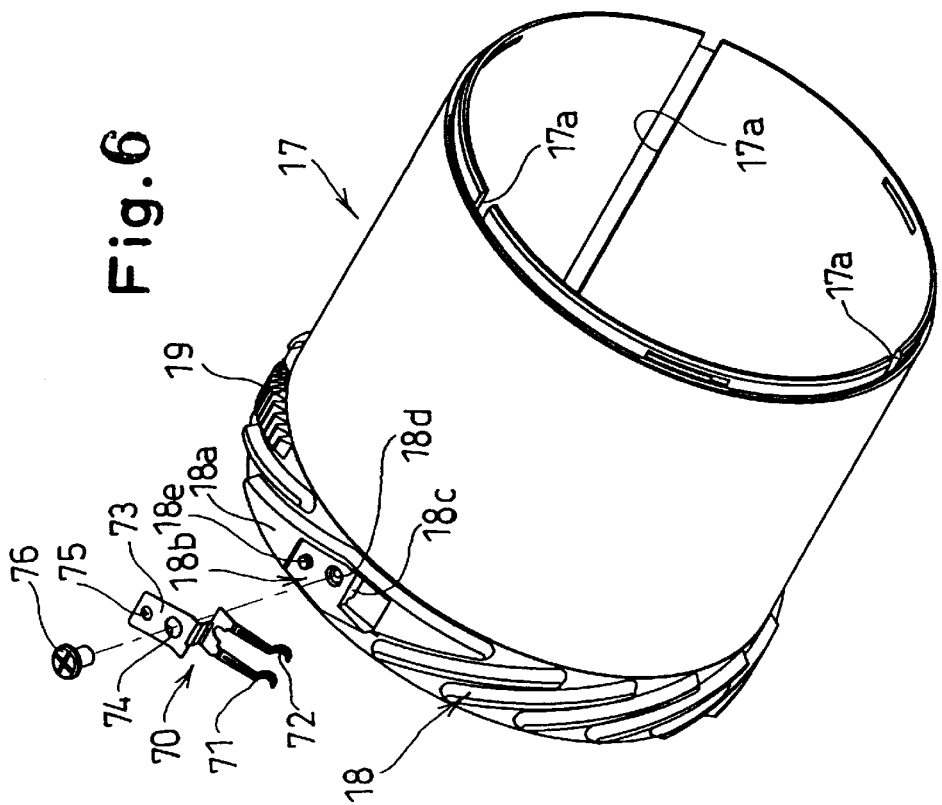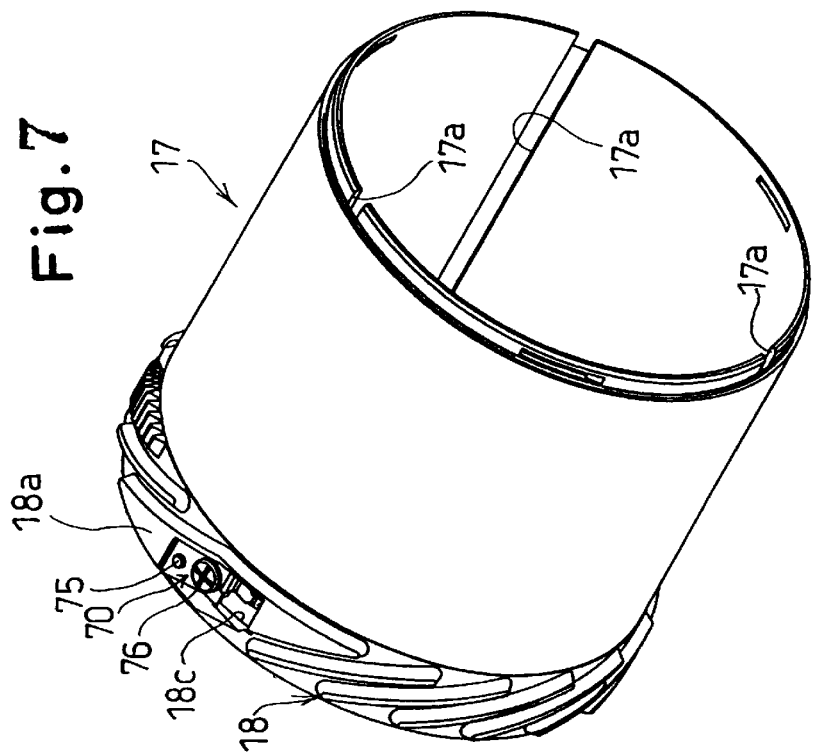

BRUSH MOUNTING STRUCTURE FOR ENCODER AND FOCAL LENGTH DETECTION MECHANISM IN A ZOOM LENS BARREL

BACKGROUND OF THE INVENTION

1. Field of the Invention

The present invention relates to a brush mounting structure for an ercoder and a focal length detection mechanism, in a zoom lens barrel.

2. Description of the Related Art

In a zoom lens camera, a focal length is detected by obtaining focal length data, via the relative sliding movement between a code plate having a predetermined circuit-path (pattern) and a brush, provided in a lens barrel. The code plate is in the form of a thin sheet which is received into, and adhered to, a shallow recess formed on a cylindrical peripheral surface of a thin lens barrel member, so that the code plate is substantially flush with the cylindrical surface of the lens barrel member. The brush is secured to another lens barrel member usually by means of screws and projects from the peripheral surface of the lens barrel member so as to come into contact with the code plate. Therefore, the mounting position of the brush is restricted; and hence, in order to provide such a brush, depending on how it is installed, the zoom lens barrel has to be enlarged, possibly reducing the strength of the lens barrel. Furthermore, upon installing such a brush, depending on how it is installed, there is an increased danger of being unable to completely block out light within the lens barrel. Namely, it is difficult to incorporate the brush in the lens barrel without increasing the size of the lens barrel and while providing sufficient strength of the lens barrel and sufficient light interception.

Moreover, in a known encoder as mentioned above, the brush defines an electrode member which is electrically connected to a focal length detection circuit of a camera body through a conductor, such as a flexible printed circuit board (FPC board). However, in this arrangement, since the number of terminals is increased, the brush is wide and large. To facilitate the electrical connection using the FPC board, the brush must be provided on the camera body or a camera component, which is guided to move linearly with respect to the camera body. Therefore, the mounting position of the brush is restricted.

In a known focal length detection mechanism of a zoom lens camera, the code plate and the brush are relatively moved in a direction parallel with the optical axis. This known focal length detection mechanism has some drawbacks. Namely, in recent zoom compact cameras, the (multi-feed type or multi-stage extension type) zoom lens barrel is usually composed of telescopic multi-stage short barrel elements which are telescopically connected in their axial direction (parallel with the optical axis) to reduce the size of the camera when the lens barrel is in a retracted position and to increase the focal length. The axial length of the code plate is restricted cue to the short axial length of the barrel elements. The code plate is provided with code circuit-paths which provide a predetermined number of split stages corresponding to the number of the split feed stages within the contact area with the brush. If the code plate is short in the axial direction, it is difficult to obtain a sufficient number of the split stages on the code plate, or the code circuit-paths must be designed finely. If no required number of split stages can be obtained, the zooming operation cannot be controlled. An increased fineness of the code circuit-paths leads to a decrease in the detection accuracy or an increase in the manufacturing cost.

SUMMARY OF THE INVENTION

It is an object of the present invention to provide a simple encoder brush mounting structure in which an encoder brush can be mounted in the zoom lens barrel without causing an increase in the size of the lens barrel or a decrease in the strength of the lens barrel, and without having an adverse influence on the light interception.

Another object of the present invention is to provide a focal length detection mechanism for a zoom lens barrel in which a brush is miniaturized whilst attaining a large relative sliding movement of the brush and a code plate.

According to an aspect of the present invention, there is provided a brush mounting structure for an encoder in a zoom lens barrel which includes: a code plate and a brush operatively arranged in a zoom lens barrel, the brush and the code plate constitute an encoder which detects the focal length in accordance with a relative sliding movement between the code plate and the brush; and a first helicoid lens barrel member, of the zoom lens barrel, which is provided with a helicoid portion; wherein the brush for detecting the focal length is provided on the first helicoid portion of the helicoid lens barrel.

If the brush is attached to the helicoid portion which is thicker than the remaining lens barrel portion, a sufficient strength or a good light interception property can be obtained in comparison with an arrangement in which the brush is provided on the thin portion of the lens barrel other than the helicoid portion.

Preferably, the brush is embedded in a thread of the helicoid portion. The thread of the helicoid portion in which the brush is embedded is preferably wider than the width of the remaining threads of the helicoid portion formed on a cylindrical surface of the barrel member. Second helicoid barrel member which engages with the first helicoid barrel member can be provided with a wide thread which engages with the wide thread of the first helicoid member.

The helicoid portion in which the brush is embedded can be provided with a through-hole which connects the outside and inside of the first helicoid barrel member in a radial direction. The brush can be provided with a contact terminal which extends through the through-hole to the surface on the side opposite to the helicoid portion so as to come into contact with the code plate. The thread of the helicoid in which the brush is embedded preferably includes a recess for inserting the brush therein.

The brush can be secured to the helicoid barrel member by means of a screw. Even if the screw is relatively long, the helicoid is thick enough to screw the same into the first helicoid barrel member.

In an embodiment, the first helicoid barrel member on which the brush is provided is moved in a direction parallel with the optical axis when it rotates relative to a camera body in a forward or reverse direction. In this embodiment, the zoom lens barrel further includes a linearly moving barrel which is rotatable relative to the first helicoid barrel member on which the brush is provided in a direction parallel with the optical axis without varying the axial relative position. The code plate extends on the linearly moving barrel in the circumferential direction thereof. The code plate and the brush are relatively slid in the circumferential direction in accordance with the relative rotation of the first helicoid barrel member and the linearly moving barrel.

According to another aspect of the present invention, there is provided a focal length detection mechanism in a zoom lens barrel, including: a linearly moving barrel which is guided to linearly move relative to a camera body in a direction parallel with the optical axis; a rotating barrel which receives therein the linearly moving barrel and which moves in the direction parallel with the optical axis relative to the camera body while relatively rotating without varying the relative position to the linearly moving barrel in the direction parallel with the optical axis when the rotating barrel rotates in a forward or reverse direction relative to the camera body; a code plate which is provided on an outer peripheral surface of the linearly moving barrel so that the length of the code plate extends in a circumferential direction; a connection mechanism for electrically connecting the code plate and a focal length detection circuit within the camera body; and a brush which is provided on an inner peripheral surface of the rotating barrel so as to come into contact with the code plate and which establishes an electrical connection of predetermined conductor circuit-paths provided on the code plate in a predetermined combination in accordance with the relative angular position between the linearly moving barrel and the rotating barrel.

With this arrangement, since the relative sliding movement of the encoder occurs in the circumferential direction, the size of the lens barrel in the direction parallel with the optical axis is not increased and the number of the terminals of the brush is restricted, thus resulting in a miniaturization of the lens barrel.

The brush can be made of a conductor which establishes an electrical connection of the conductor circuit-paths (code pattern) of the code plate. The conductor is provided with a pair of conductor terminals which can be brought into contact with the code plate.

In an embodiment, the code plate is received in a code receiving groove which is formed in an outer peripheral surface of the linearly moving barrel, the groove having a depth corresponding to the thickness of the code plate, so that the code plate is substantially flush with the outer peripheral surface of the linearly moving barrel.

Preferably, the code plate and the connection mechanism are integrally formed by a flexible printed circuit board.

The present disclosure relates to subject matter contained in Japanese Patent Applications Nos. 9-292577 filed on Oct. 24, 1997) and 9-292578 (filed on Oct. 4, 1997) which are expressly incorporated herein by reference in their entireties.

BRIEF DESCRIPTION OF THE DRAWINGS

The invention will be discussed below in detail with reference to the accompanying drawings, in which:

FIG. 6 is a perspective view of a first outer barrel and a brush in a disassembled position;

FIG. 7 is a perspective view of a first outer barrel and a brush in an assembled position; and, FIG. 8 is a developed view of the portion of a first outer barrel that is located in the vicinity of a brush mount.

DESCRIPTION OF THE PREFERRED EMBODIMENT

Figure 1:
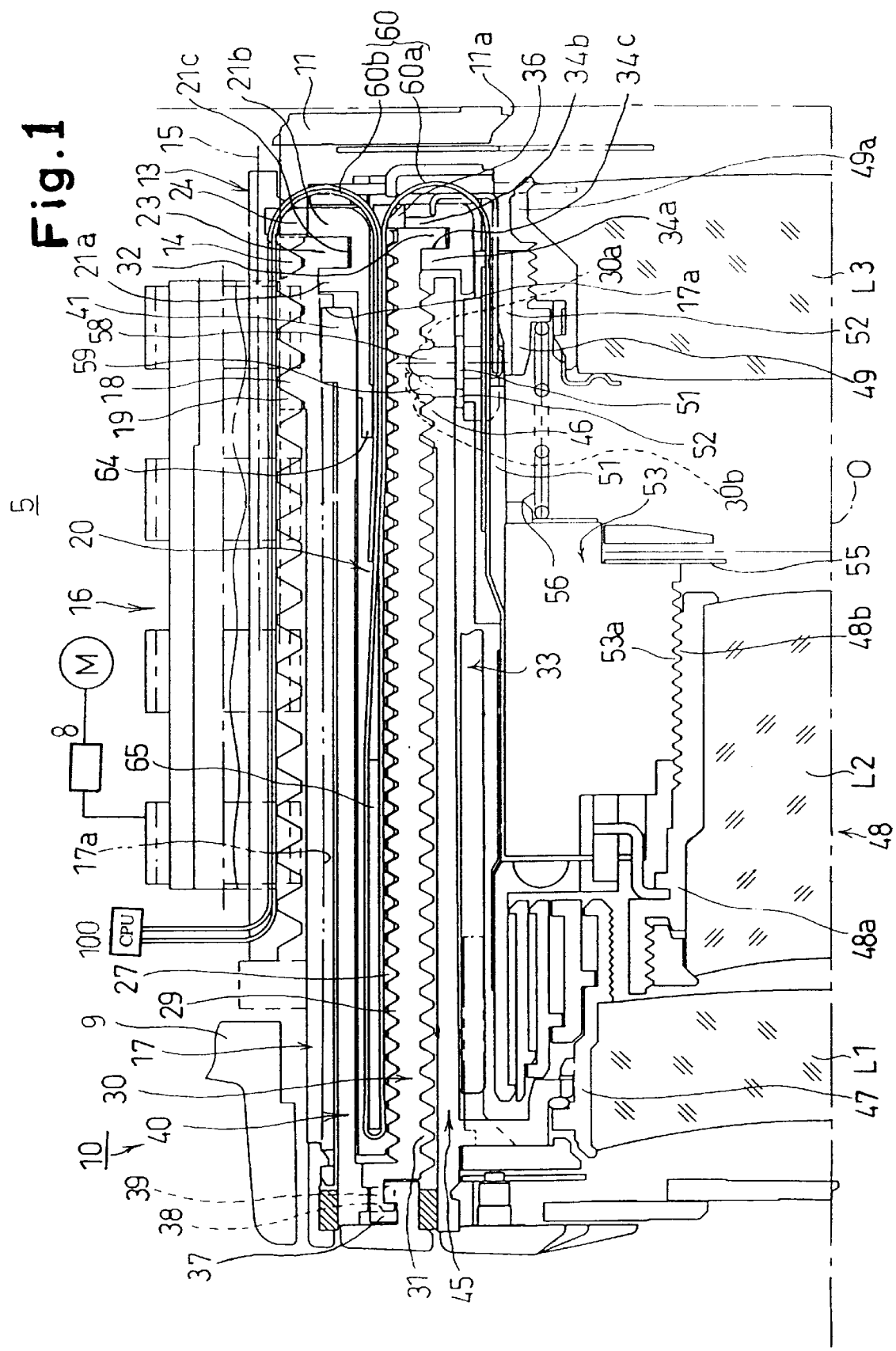
FIG. 1 is a longitudinal sectional view of a zoom lens barrel in a retracted position, to which a focal length detection mechanism and a brush mounting structure are applied, according to an embodiment of the present invention.
Figure 2:
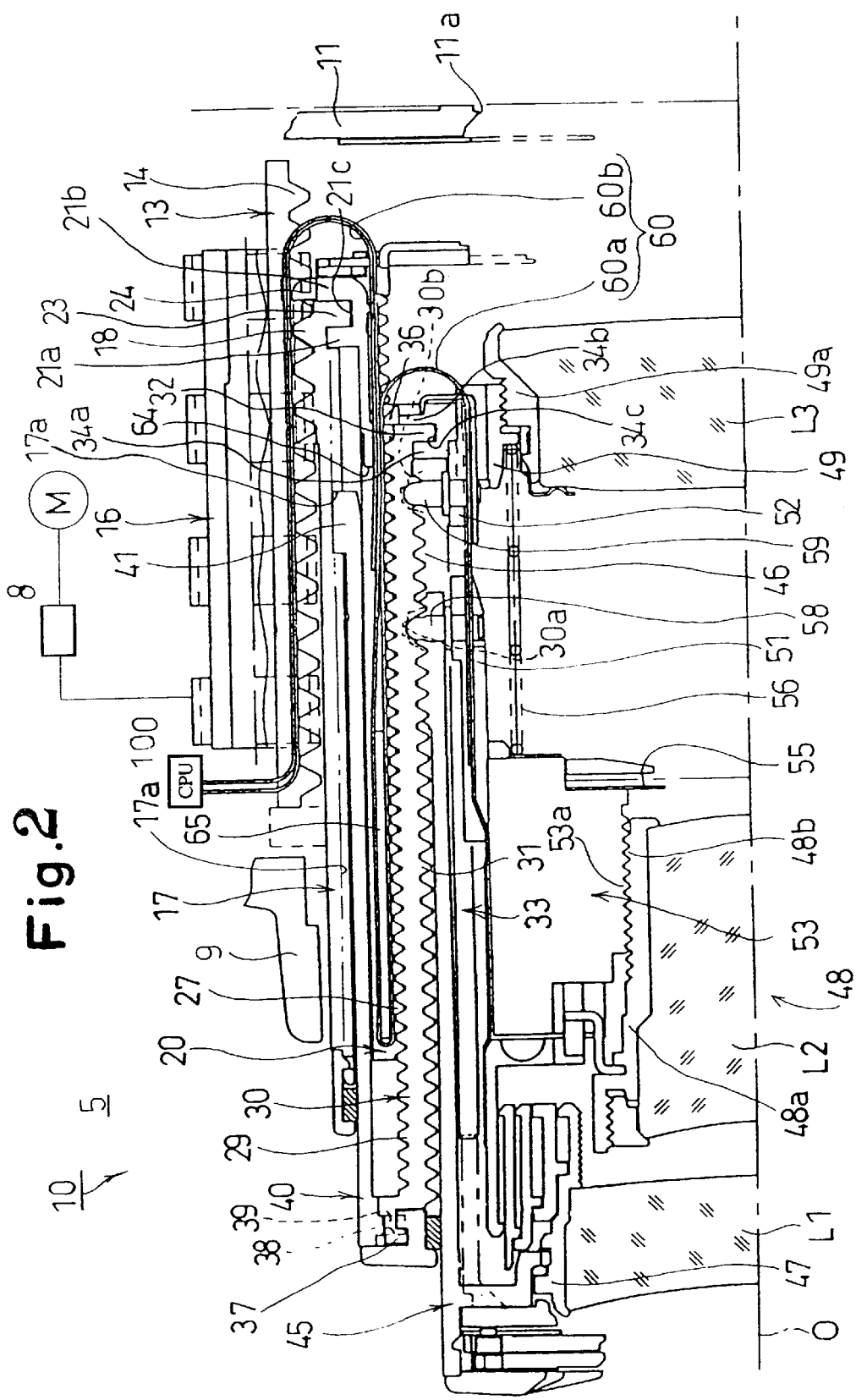
FIG. 2 is a longitudinal sectional view of a zoom lens barrel shown in FIG. 1, at a wide angle extremity.

A zoom lens barrel 10 can be attached to a camera body 9 of a zoom compact camera 5 and is composed of a first lens group L1, a second lens group L2, and a third lens group L3. The zooming operation is carried out by varying the distance between the three lens groups, and by varying the distance between the film surface and each lens group. The focusing operation is carried out by moving the second lens group L2 in a direction parallel with the optical axis O. The whole structure and operation of the zoom lens barrel 10 will be discussed below with reference to FIGS. 1 through 4.

An aperture plate 11 is secured in the camera body 9 so that the edge of the aperture plate 11 defines an aperture 11a which determines the exposure area for a film. A stationary barrel (second helicoid barrel member) 13 is secured to the camera body 9 in front of the aperture plate 11. The stationary barrel 13 is provided on the inner peripheral surface with a female helicoid (internal helicoid) 14 and three linear movement guide grooves 15 which extend in parallel with the optical axis O and which are circumferentially spaced from one another.

The stationary barrel 13 is provided with a recess 13a (FIG. 4) which extends in parallel with the optical axis O, so that a zoom gear 16 is attached adjacent the recess 13a. The zoom gear 16 is supported so as to rotate about an axis substantially parallel with the optical axis O and has pinions whose teeth project into the inside of the stationary barrel 13 through the recess 13a. A zoom motor M is provided in the camera body 9, so that the rotation of the drive shaft of the zoom motor M is transmitted to the zoom gear 16 through a zoom gear train 8.

The female helicoid 14 of the stationary barrel 13 is engaged by a male helicoid (external helicoid) 18 formed on the outer peripheral surface of a first outer barrel (rotational feed barrel or first helicoid barrel member) 17 at the rear end thereof. The width of the male helicoid 18 in the direction of the optical axis is such that the male helicoid 18 is not exposed to the outside when the first outer barrel 17 is extended to the most advanced position. The first outer barrel 17 is provided on the outer peripheral surface thereof, on which the male helicoid 18 is formed, with a plurality of outer peripheral gear segments 19 that extend in parallel with the male helicoid 18. The teeth of each outer peripheral gear segment 19 extend in parallel with the optical axis O and are engaged by the zoom gear 16. The first outer barrel 17 is provided on the inner peripheral surface thereof with three rotation transmission grooves 17a which extend from the front end to the rear end of the first outer barrel 17 in the direction parallel with the optical axis O.

The male helicoid 18 of the first outer barrel 17 is equipped with a brush 70 which is adapted to detect the focal length of the zoom lens barrel 10. The brush will be explained hereinafter.

A first linear movement guide ring (linear movement barrel) 20 is provided in the first outer barrel 17. The first linear movement guide ring 20 is provided, on the outer peripheral surface at the rear end thereof, with a pair of circumferentially parallel flanges 21a and 21b that extend in a radial direction. The flanges 21a and 21b define therebetween an annular groove 21c whose center is located on the optical axis O. The first outer barrel 17 is provided, on the inner peripheral surface at the rear end thereof, with a plurality of engagement projections 23 (only one of which is shown in the drawings, see FIGS. 1 through 3) that are spaced from one another in a circumferential direction and project in the radial and inward direction. The thickness of each projection 23 is such that the projections are snugly fitted in the annular groove 21c formed in the first linear movement guide ring 20 in the direction parallel with the optical axis O so as to slide therein in the circumferential direction. Consequently, when the engagement projections 23 are fitted in the annular groove 21c, the first outer barrel 17 and the first linear movement guide ring 20 are interconnected so as not to move relative to each other in the axial direction but to rotate relative to each other. Note that the coupling composing the engagement projections 23 and the annular groove 21c is in the form of a bayonet coupling, and can be disconnected from or connected to one another at a predetermined relative angular position.

Figure 4:
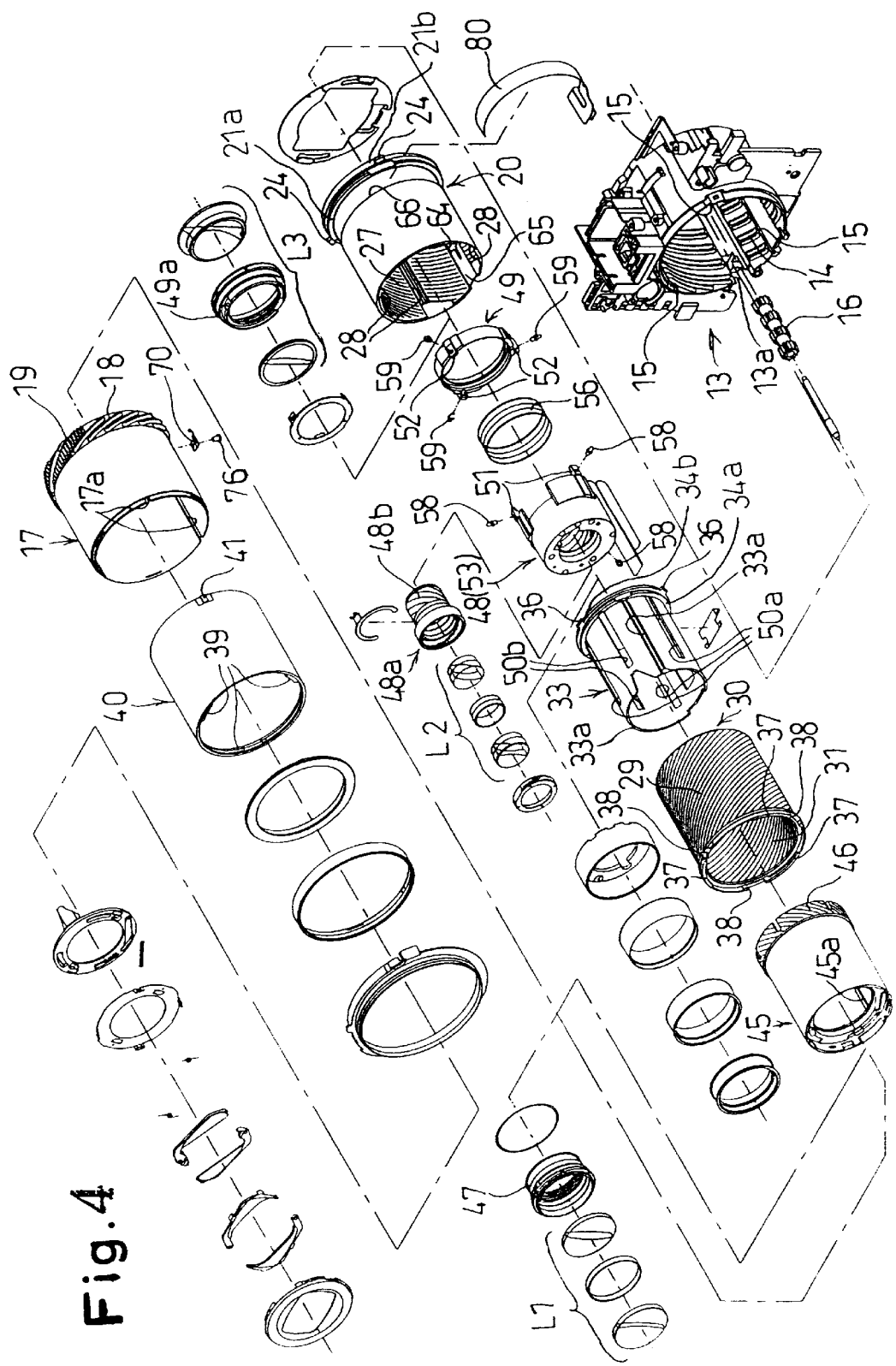
FIG. 4 is an exploded perspective view of a zoom lens barrel.

The first linear movement guide ring 20 is provided on the outer peripheral surface at the rear end thereof with three radially projecting linear movement guide projections 24 (only two of them are shown in FIG. 4) that are spaced from one another in the circumferential direction. The linear movement guide projections 24 are slidably engaged in the linear movement guide grooves 15 formed on the inner peripheral surface of the stationary barrel 13. Consequently, the first linear movement guide ring 20 is moved together with the first outer barrel 17 in the axial direction without rotating relative to the stationary barrel 13 in the circumferential direction about the optical axis O. Thus, the linear movement of the first linear movement guide ring 20 is guided.

The first outer barrel 17 and the first linear movement guide ring 20 constitute a first feed stage (extension stage) of the zoom lens barrel 10. In the first feed stage, when the zoom gear 16 is rotated in a predetermined direction by the zoom motor M, the first outer barrel 17 is rotated through the outer peripheral gear segments 19, so that the first outer barrel 17 is advanced from the stationary barrel 13 while rotating in accordance with the relationship between the female helicoid 14 and the male helicoid 18. At the same time, the first linear movement guide ring 20 which is supported to rotate relative to the first outer barrel 17 is moved together with the first outer barrel 17 relative to the stationary barrel 13 in the axial direction parallel with the optical axis O while being linearly guided.

The first linear movement guide ring 20 is equipped on its outer peripheral surface with a code plate 80 which constitutes a focal length detection mechanism together with the brush 70. The code plate 80 will be discussed hereinafter.

The first linear movement guide ring 20 is provided on its inner peripheral surface with a female helicoid 27 whose direction is the same as the female helicoid 14. The first linear movement guide ring 20 is also provided on its inner peripheral surface with three linear movement guide grooves 28 that extend in parallel with the optical axis O and that are spaced from one another at a predetermined angular distance in the circumferential direction.

A drive cam ring 30 is provided in the first linear movement guide ring 20. The drive cam ring 30 is provided on the outer peripheral surface thereof with a male helicoid 29 which engages with the female helicoid 27. The male helicoid 29 is formed on the entire peripheral surface of the drive cam ring 30. Also, the drive cam ring 30 is provided on its entire inner peripheral surface with a female helicoid 31 whose inclination direction is opposite to that of the male helicoid 29.

A second linear movement guide ring 33 is provided in the drive cam ring 30. The second linear movement guide ring 33 is provided, on the outer peripheral surface at the rear end thereof, with a pair of circumferentially parallel flanges 34a and 34b that extend in the radial and outward direction. The flanges 34a and 34b define therebetween an annular groove 34c whose center is located on the optical axis O. When the engagement projections 32 of the drive cam ring 30 are fitted in the annular groove 34c, the drive cam ring 30 and the second linear movement guide ring 33 are interconnected so as not to move relative to each other in the axial direction but to rotate relative to each other. Note that the coupling composing the engagement projections 32 and the annular groove 34c is in the form of a bayonet coupling and can be disconnected from or connected to one another at a predetermined relative angular position.

The second linear movement guide ring 33 is provided at the rear end thereof with three linear movement guide projections 36 (only two of them are shown in FIG. 4) at different circumferential positions, that project outward in the radial direction. The linear movement guide projections 36 are slidably engaged in respective linear movement guide grooves 28 formed on the inner peripheral surface of the first linear movement guide ring 20. Consequently, the second linear movement guide ring 33 is linearly guided in the first linear movement guide ring 20 so as to move relative to the stationary barrel 13 through the first linear movement guide ring 20.

A second outer barrel 40 is located between the first outer barrel 17 and the first linear movement guide ring 20. Three rotation transmission projections 41 (only one of which is shown in FIG. 4) provided on the outer peripheral surface of the second outer barrel 40 at the rear end thereof in different circumferential positions are slidably fitted in the three rotation transmission grooves 17a formed on the inner peripheral surface of the first outer barrel 17 and extending in parallel with the optical axis O. Thus, the second outer barrel 40 is guided so as not to relatively rotate but so as to move relative to the first outer barrel 17 along the optical axis O.

The drive cam ring 30 is provided on the front end thereof with a rib 37 having a predetermined thickness in the radial direction of the drive cam ring 30. The rib 37 is equipped with three cut-away portions 38. The second outer barrel 40 is equipped, on the inner peripheral surface at the front end thereof, with three engaging projections 39 that can be engaged in the cut-away portions 38 of the rib 37 and that project in the radial direction. The drive cam ring 30 and the second outer barrel 40 are interconnected so as not to relatively move in the optical axis direction, and so as not to relatively rotate when the engaging projections 39 are engaged in the cut-away portions 38. Consequently, when the second outer barrel 40 is rotated in association with the rotation of the first outer barrel 17, the rotation of the drive cam ring 30 takes place. As a result, the drive cam ring 30 integral with the second outer barrel 40 is advanced from the first linear movement guide ring 20 which constitutes a first feed stage, in accordance with the relationship between the female helicoid 27 and the male helicoid 29.

The drive cam ring 30, the second outer barrel 40 and the second linear movement guide ring 33 constitute a second feed stage (extension stage) of the zoom lens barrel 10. When the first outer barrel 17 which constitutes the first feed stage is rotated and extended from the stationary barrel 13, the second outer barrel 40 is rotated in association with the first outer barrel 17 due to the engagement between the rotation transmission grooves 17a and the rotation transmission projections 41. The drive cam ring 30 to which the rotation of the second outer barrel 40 is transmitted is advanced from the first linear movement guide ring 20 together with the second outer barrel 40, while rotating relative to the stationary barrel 13 in the same direction as the first outer barrel 17, in accordance with the engagement between the female helicoid 27 and the male helicoid 29. At the same time, the second linear movement guide ring 33, which is connected to the drive cam ring 30 so as to rotate relative thereto, is moved in the direction of the optical axis together with the drive cam ring 30 while being guided by the first linear movement guide ring 20 in accordance with the engagement between the linear movement guide projections 36 and the linear movement guide grooves 28.

A third outer barrel 45 is provided in the drive cam ring 30. The second linear movement guide ring 33 is located in the third outer barrel 45. The second linear movement guide ring 33 is provided on the outer peripheral surface thereof with a plurality of linear movement guide grooves 33a extending in parallel with the optical axis O. The third outer barrel 45 is provided on its inner peripheral surface with a plurality of linear movement guide projections 45a (only one of which is shown in FIG. 4) which can be engaged by the linear movement guide grooves 33a. The linear movement guide projections 45a provided in the third outer barrel 45 are slidably engaged by the linear movement guide grooves 33a provided in the second linear movement guide ring 33, so that the third outer barrel 45 can be moved in the direction parallel with the optical axis O relative to the second linear movement guide ring 33 through the engagement of the linear movement guide grooves 33a and the linear movement guide projections 45a.

The third outer barrel 45 is provided on the outer peripheral surface at the rear end thereof with a male helicoid 46 which engages with the female helicoid 31 formed on the inner peripheral surface of the drive cam ring 30. When the drive cam ring 30 is rotated, the rotational force is applied to the third outer barrel 45, but the third outer barrel 45 which is linearly guided by the second linear movement guide ring 33 does not rotate together with the drive cam 30. Consequently, the third outer barrel 45 is advanced relative to the drive cam ring 30 while moving in the direction parallel with the optical axis O relative to the stationary barrel 13 via the male helicoid 46 and the female helicoid 31. Namely, the third outer barrel 45 constitutes a third feed stage (extension stage) of the lens barrel. The length of the male helicoid 46 in the direction of the optical axis is such that the male helicoid 46 is not exposed to the outside when the third outer barrel 45 is extended to the maximum extension position.

A first lens frame 47 which holds the first lens group L1 is secured to the third outer barrel 45.

The second linear movement guide ring 33 is provided on the peripheral surface thereof with three axially extending second lens guide through slits 50a which are adapted to guide the second lens group L2 and three axially extending third lens guide through slits 50b which are adapted to guide the third lens group L3. The second lens guide through slits 50a and the third lens guide through slits 50b are alternately arranged in the circumferential direction.

The second lens group L2 is held by a second lens support frame 48a which constitutes a second lens unit 48, and the third lens group L3 is held by a third lens support frame 49a which is supported in the third lens support ring 49. The shutter block 53 of the second lens unit 48 is provided on the outer peripheral surface with three sliding plates 51. The sliding plates 51 are slidably fitted in the second lens guide slits 50a. Likewise, the third lens support ring 49 is provided on the outer peripheral surface with three sliding plates 52. The sliding plates 52 are slidably fitted in the third lens guide slits 50b. Thus, the second lens unit 48 (second lens support frame 48a) and the third lens support ring 49 (third lens support frame 49a) can be independently slid within the second linear movement guide ring 33 in the direction parallel with the optical axis O. Note that a compression spring 56 is provided between the second lens unit 48 and the third lens support ring 49 to remove a backlash, so that the second lens unit 48 and the third lens support ring 49 are biased forward and rearward, respectively.

The second lens unit 48 supported in the drive cam ring 30 and the third lens support ring 49 are moved in the axial direction in accordance with the feed operation of the zoom lens barrel 10. Namely, the sliding plates 51 of the second lens unit 48 and the sliding plates 52 of the third lens support ring 49 are provided with radially projecting guide pins 58 and 59. The drive cam ring 30 is provided on the inner peripheral surface thereof with predetermined profiles of cam grooves 30a and 30b corresponding to the guide pins 58 and 59. The guide pins 58 and 59 are slidably fitted in the cam grooves 30a and 30b, respectively. The guide grooves 30a which guide the guide pins 58 and the cam grooves 30b which guide the guide pins 59 have a non-linear oblique profile. Consequently, when a relative rotation between the drive cam ring 30 and the second linear movement guide ring 33 occurs, the second lens group L2 (second lens unit 48) and the third lens group L3 (third lens support ring 49) are relatively moved in the direction parallel with the optical axis O, respectively, through the guide pins 58 and 59.

The shutter block 53 of the second lens unit 48 is provided on the shaft portion thereof with a threaded hole (internal thread) 53a in which an external thread 48b of the second lens frame 48a is screw-engaged. The shutter block 53 includes therein a focusing motor which, upon focusing, drives the second lens frame 48a due to the engagement between the internal thread 53a and the external thread 48b in accordance with an object distance signal supplied from a focusing device and a focal length signal produced by the zooming operation to thereby move the second lens group L2 in the direction of the optical axis. The shutter block 53 is provided with shutter blades 55 which function also as a diaphragm and which are opened and closed in accordance with an object brightness signal. The shutter block 53 receives drive signals which are used for driving the shutter and the focusing operation through an FPC (Flexible Printed Circuit) board 60.

The FPC board 60 is composed of a shutter substrate 60a connected to the shutter block 53 and a code plate substrate 60b connected to the code plate 80 which is adhered to the outer peripheral surface of the first linear movement guide ring 20. The substrates 60a and 60b have a length long enough to permit the extension and retraction of the zoom lens barrel 10. The FPC board 60 is connected at the other end to a CPU 100 in the camera body.

The zoom lens barrel 10 operates as follows. If the zoom motor M is driven in the extension direction of the zoom lens barrel in the retracted position shown in FIG. 1 or in the wide-angle extremity shown in FIG. 2, the first outer barrel 17 is rotated and advanced from the stationary barrel 13. Consequently, the first linear movement guide ring 20 is moved forward together with the first outer barrel 17 while being linearly guided by the stationary barrel 13. As a result, the drive cam ring 30 is advanced together with the second outer barrel 40 from the first linear movement guide ring 20 while rotating in the same direction as the first outer barrel 17. At the same time, the linear movement of the second linear movement guide ring 33 in the axial direction, together with the drive cam ring occurs. When the rotation of the drive cam ring 30 takes place, the second lens group L2 and the third lens group L3 are moved forward in the direction of the optical axis while varying the distance between the second and third lens groups L2 and L3 within the second feed stage, in accordance with the engagement between the guide pins 58 and 59 and the corresponding cam grooves 30a and 30b. Moreover, the third outer barrel 45 which is linearly guided by the second linear movement guide ring 33 is moved forward in the direction of the optical axis in accordance with the rotation of the drive cam ring 30, so that the first lens group L1 is moved forward relative to the second and third lens groups L2 and L3. If the zoom motor M is driven in the retraction direction of the lens barrel at the telephoto extremity shown in FIG. 3, the zoom lens barrel 10 operates in the opposite way to the above-mentioned operation.

As can be seen from the foregoing, in the three-stage feed type zoom lens barrel 10, the zooming operation is carried out by varying the distance of the first, second and third lens groups L1, L2 and L3 from the film surface and by varying the distance between the lens groups in combination, and the focusing operation is carried out by moving the second lens group L2 in the direction of the optical axis, respectively.

The focal length detection mechanism of the zoom lens barrel 10 will be discussed below with reference to FIGS. 5 through 8.

Figure 5:
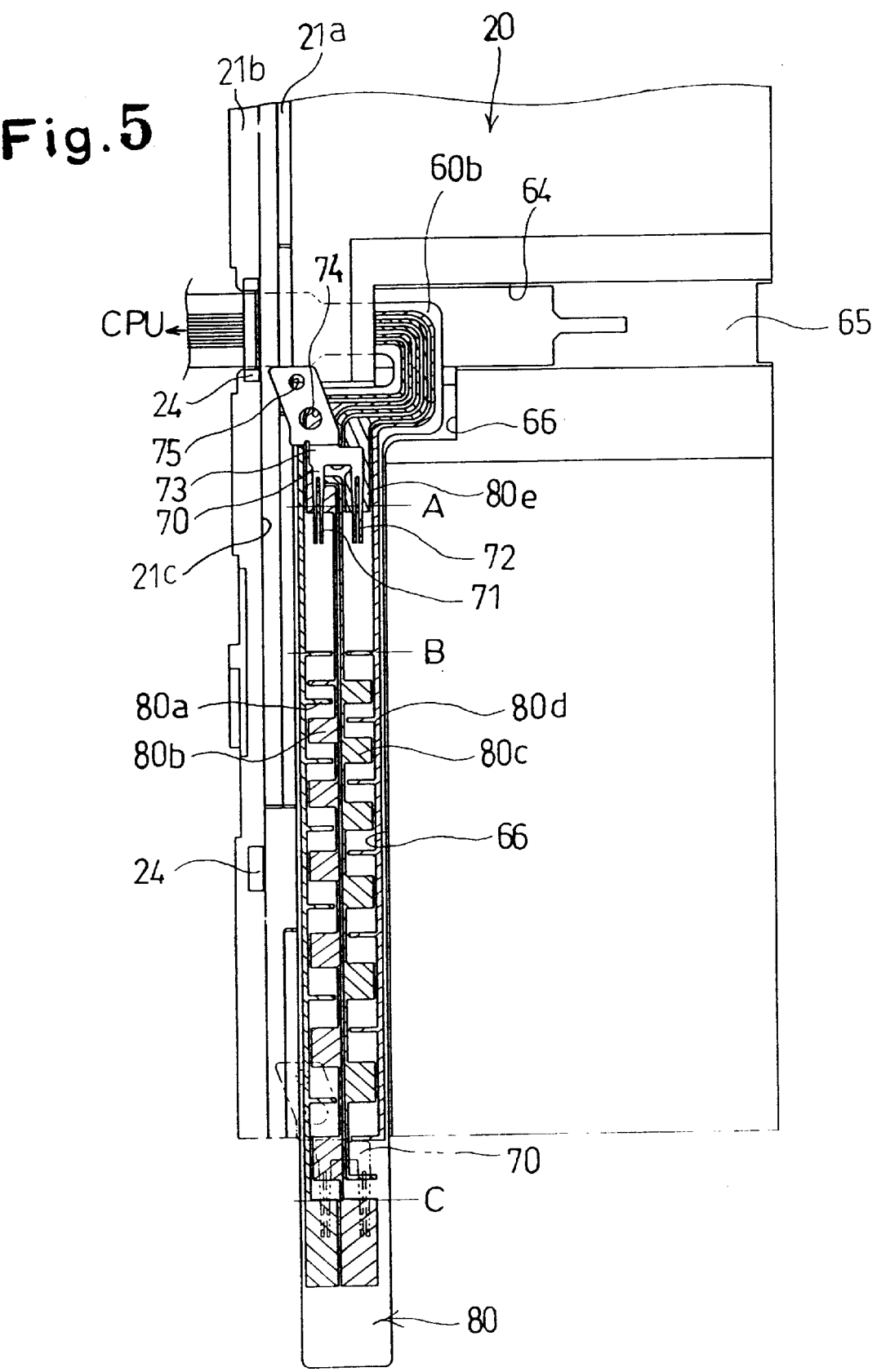
FIG. 5 is a developed view of a first linear movement guide ring and a code plate adhered to the outer peripheral surface thereof.

The FPC board 60 comprised of the shutter substrate 60a and the code substrate 60b is introduced onto the inner peripheral surface at the rear end of the first linear movement guide ring 20 from the outside of the stationary barrel 13. The first linear movement guide ring 20 is provided with an FPC board guide hole 64 through which the inner peripheral surface is connected to the outer peripheral surface. The FPC board 60 extends in the guide hole 64 and extends to the outer surface of the first linear movement guide ring 20. The shutter substrate 60a extends forward in the optical axis direction and is supported by a support plate 65 and is bent at the front end of the first linear movement guide ring 20 toward the inner peripheral side. As shown in FIG. 5, the code substrate 60b extends through the FPC board guide hole 64 and is bent in the circumferential direction of the first linear movement guide ring 20 to extend along the outer surface of the first linear movement guides ring 20. Note that in FIG. 5, the shutter substrate 60a is omitted.

The first linear movement guide ring 20 is provided on its outer peripheral surface with a code plate receiving groove with a bottom (U-shaped recess) 66 which extends from the end thereof adjacent the FPC board guide hole 64 in the circumferential direction. The radial depth of the code plate receiving groove 66 corresponds to the thickness of the code plate 80 and the recessed bottom surface thereof defines a partial cylindrical surface (see FIG. 4). The width of the code place receiving groove 66 in the direction parallel with the optical axis O is slightly larger than the width (minor side) of the code plate 80 and the length of the code plate receiving groove 66 in the circumferential direction is slightly longer than the length (major side) of the code plate 80. The code plate 80 in the form of an elongated rectangle is adhered to the bottom surface of the code plate receiving groove 66 and extends in the circumferential direction of the first linear movement guide ring 20. The code plate 80 is connected at its one end to the code plate substrate 60b. A known adhering means such as an adhesive or a double-sided adhesive tape, etc., can be used to adhere the code plate 80 to the code plate receiving groove 66. The code plate 80 has a certain thickness and the depth of the code plate receiving groove 66 corresponds to the thickness of the code plate 80. Therefore, the code plate 80 is substantially flush with the cylindrical surface of the first linear movement guide ring 20. Although the code plate substrate 60b and the code plate 80 have been or will be separately discussed, they are made integral to form the FPC board.

Opposite surfaces of the code plate substrate 60b are covered with an insulating member, but the front surface of the code plate 80 adhered to the code plate receiving groove 66 is not covered by the insulating member, so that a conductor surface of the code plate is exposed. The exposed conductor surface of the code plate 80 is hatched in FIG. 5. Namely, five different electrodes 80a through 80e are arranged in a direction perpendicular to the length of the code plate 80. Each electrode is connected to the CPU 100 of the camera body through conductors within the code plate substrate 60b.

Figure 8:
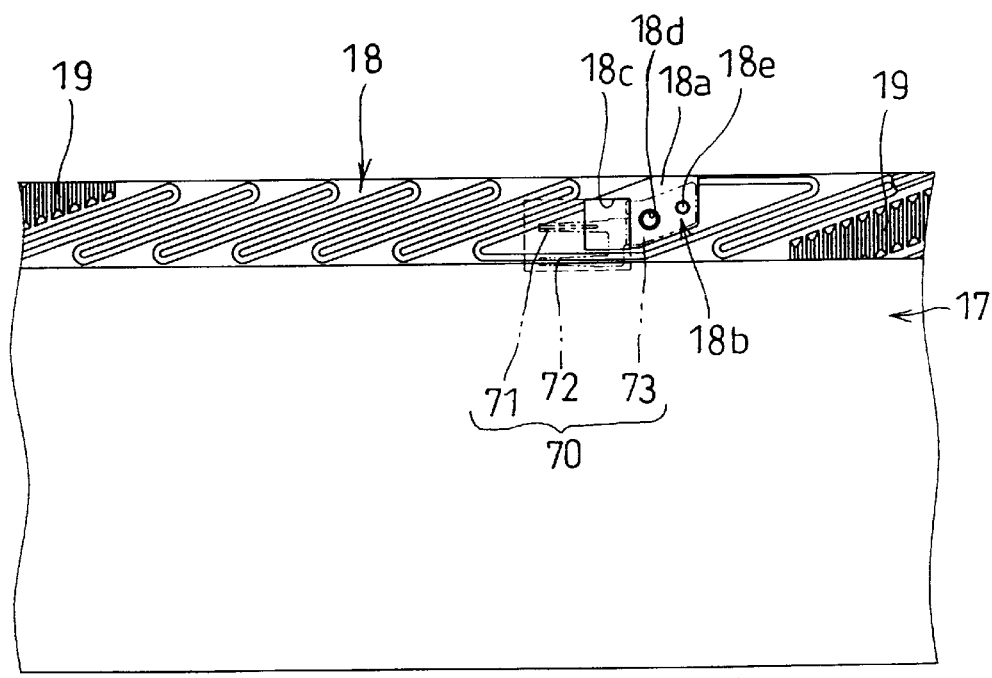

As can be seen in FIGS. 6 through 8, in the first outer barrel 17, the thread ridge of the helicoid portion (male helicoid 18) is inevitably thicker, so that the thread diameter is larger than the diameter of the cylindrical surface portion of the first outer barrel 17.

The brush 70 is embedded in the thread ridge of the male helicoid 18a as follows:

The male helicoid 18 includes a wide thread portion (thread ridge) 18a whose width is larger than the width of the remaining threads of the male helicoid. The wide thread portion 18a is partly recessed to define a brush mounting recess 18b. The brush mounting recess 18b is provided on its bottom surface with a through-hole 18c which extends to the inside of the first outer barrel 17. Also, there is a threaded hole 18d and a positioning projection 18e near the through-hole 18c.

Since the threaded hole 18d is formed in the male helicoid 18 which has a larger thread diameter than the diameter of the cylindrical surface portion of the first outer barrel 17 and is surrounded by the thick thread of the male helicoid 18, any Light that may enter from the front of the zoom lens barrel cannot pass through the threaded hole 18d; namely, light interception is not deteriorated due to providing the threaded hole 18d. Moreover, since the brush mounting recess 18b and the threaded hole 18d are formed in the thread portion of male helicoid 18, the strength of the first outer barrel 17 is not reduced substantially.

The brush 70 is attached to the brush mounting recess 18b. The brush 70 is formed by pressing a conductor material (metal plate) and is composed of a support 73 and a pair of contact terminals (conductor terminals) 71 and 72 extending therefrom. The support 73 is provided with a screw insertion hole 74 and a positioning hole 75. When a screw 76 is inserted and screwed in the screw insertion hole 74 and the threaded hole 18d while the positioning projection 18e is fitted in the positioning hole 75, the brush 70 is secured to the brush mounting recess 18b of the first outer barrel 17 at a predetermined position (FIG. 7). Since the brush 70 is embedded in the brush mounting recess 18b, the brush 70 does not project outward in the radial direction from the male helicoid 18. The female helicoid 14 of the stationary barrel 13 is provided with a wide thread (thread groove, not shown) which engages with the wide thread portion 18a. Therefore, when the brush 70 is mounted, the brush does not interfere with the axial movement of the first outer barrel 17.

When the brush 70 is secured to the first outer barrel 17, the front ends of the contact terminals 71 and 72 project into the inside of the first outer barrel 17 through the through-hole 18c. As mentioned above, since the second outer barrel 40 is provided between the inner surface of the first outer barrel 17 and the outer surface (code plate 80) of the first linear movement guide ring 20, and hence there is a slight gap therebetween in the radial direction. The amount of projection of the contact terminals 71 and 72 is predetermined, taking into account the radial gap, so that the contact terminals 71 and 72 can be brought into elastic contact with the outer peripheral surface of the first linear movement guide ring 20. As shown in FIG. 5, the contact terminals 71 and 72 are located in an axial position corresponding to the code plate 80 adhered to the first linear movement guide ring 20. Consequently, in an assembled state of the zoom lens barrel 10, the contact terminals 71 and 72 of the brush 70 are in contact with the code plate 80. Note that the cylindrical surface of the second outer barrel 40 provided between the first outer barrel 17 and the first linear movement guide ring 20 is partially cut away so as to permit the brush 70 to come into contact with the code plate 80.

Upon zooming, the first outer barrel 17 and the first linear movement guide ring 20 relatively rotate while moving together in the axial direction. Namely, the brush 70 (contact terminals 71, 72) and the code plate 80 relatively slide during the zooming operation, and the contact position changes in the circumferential direction of the lens barrel. The electrodes 80a through 80e of the code plate 80, constituting predetermined circuit-paths, are selectively connected when the brush 70 slides in the longitudinal direction of the code plate 80, so that predetermined focal length data can be output in accordance with the sliding contact position.

For instance, in a retracted position of the zoom lens barrel 10 (FIG. 1), the contact terminals 71 and 72 of the brush 70 are in contact with the code plate 80 at a position "A" shown in FIG. 5, in accordance with the angular phase of the first outer barrel 17 and the first linear movement guide ring 20. In the position "A", the contact terminal 71 is in contact with the electrode 80b and the contact terminal 72 is in contact with the electrode 80e, so that a connection between the electrodes 80b and 80e can be established (circuit-path 1). In the illustrated embodiment of the focal length detection mechanism, since the code plate 80 is connected to the CPU 100 of the camera body, a pair of contact terminals 71 and 72 connect the two different electrodes on the code plate 80 side. The CPU 100 judges that when the connection between the electrodes 80b and 80e established at the position "A" is detected, the lens barrel is in the retracted position.

When the zoom lens barrel 10 is extended to the wide angle extremity (FIG. 2), a relative rotation between the first outer barrel 17 and the first linear movement guide ring 20 takes place, so that the brush 70 is slid downward relative to the codes plate 80 in FIG. 5. The contact position of the brush 70 and the code plate 80 at the wide angle extremity is indicated by "B" in FIG. 5. There is no electrode (hatched portion) on the track of the movement of the brush 70 on the code plate 80 between the position "A" corresponding to the retracted position of the lens barrel and the position "B" corresponding to the wide angle extremity, and hence no focal length detection signal is detected. When the contact terminals 71 and 72 are respectively in contact with the electrodes 80a and 80d, at the position "B", the electrodes 80a and 80d are interconnected (circuit-path 2). Since the combination of the electrodes to be interconnected in circuit-path 2 is different from that in circuit-path 1 corresponding to the retracted position "A", the CPU 100 detects that the lens barrel is extended to the wide angle extremity.

If the lens barrel is extended from the wide angle extremity, the brush 70 is slid relative to the code plate 80, so that the contact terminals 71 and 72 are repeatedly connected to the electrodes 80b and 80c (circuit-path 3); the electrodes 80a and 80c (circuit-path 4); and the electrodes 80b and 80d (circuit-path 5), in this order. Thus, the electrodes 80b and 80c; the electrodes 80a and 80c; and the electrodes 80b and 80d are repeatedly interconnected in this order. The combinations of the electrodes to be interconnected in circuit-paths 3 through 5 are different from those in circuit-path 1 or 2. If the electrodes are connected in circuit-path 3, 4 or 5, the CPU 100 detects the focal lengths split between the wide angle extremity and the telephoto extremity. Namely, in the illustrated embodiment, the focal length is split into 19 stages between the wide angle extremity and the telephoto extremity. To detect the 19 focal lengths using the three circuit-paths 3, 4 and 5, the circuit-paths 3, 4, and 5 are repeated 6 times (7 times for circuit-path 3 only). To this end, for example, circuit-path 3 defines a reference code, so that the number of detections of the reference code is counted to accurately detect the focal length at 19 stages.

Figure 3:
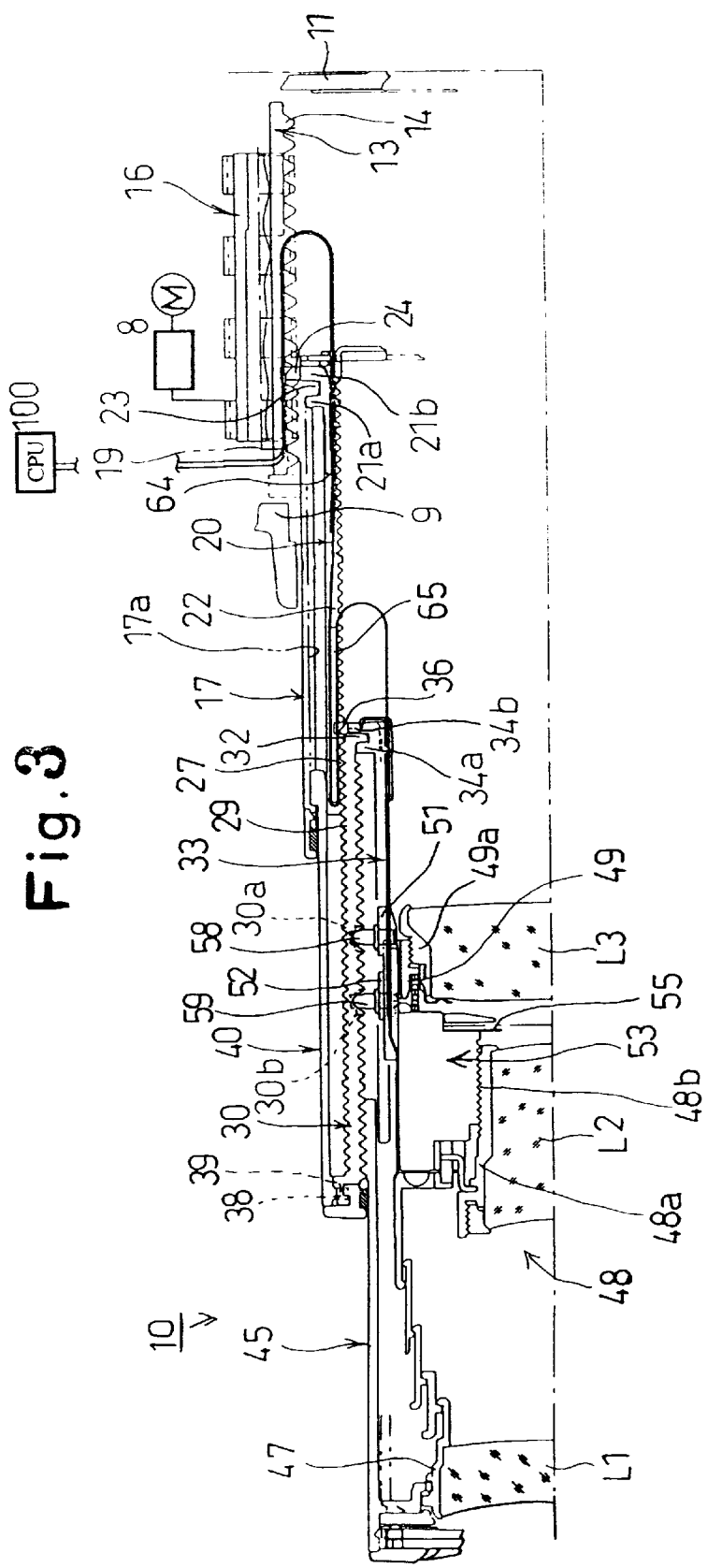
FIG. 3 is a longitudinal sectional view of a zoom lens barrel shown in FIG. 1, at a telephoto extremity.

Further rotation of the first outer barrel 17 and the first linear movement guide ring 20 caused by the extension of the lens barrel moves the brush 70 to the position "C" (circuit-path 6) in which the contact terminals 71 and 72 are in contact with the electrodes 80a and 80b, respectively, so that the electrodes 80a and 80b are connected. The combination of the electrodes to be connected is different from the combination of the electrodes in any of the circuit-paths 1 through 5. If circuit-path 6 is detected, the CPU 100 judges that the zoom lens barrel 10 is extended to the most advanced position, i.e., the telephoto extremity (FIG. 3).

The focal length upon retraction of the lens barrel can be detected in the same way as the above-mentioned process. No duplicate explanation is given herein. In summary, the focal length is detected in accordance with the sliding contact between the brush 70 and the code plate 80 relatively provided on the first outer barrel 17 and the first linear movement guide ring 20, which relatively rotate in the retraction direction.

In the zoom lens barrel illustrated in the drawings, since the brush is attached to the helicoid portion which is inevitably thicker than the cylindrical surface portion of the barrel, the brush can be attached even to a thin barrel member without reducing the strength of the lens barrel. Moreover, no additional brush mounting space is necessary. Since the helicoid portion is not exposed to the outside, a good appearance of the lens barrel can be obtained. In the illustrated embodiment, the through-hole which extends from the outside to the inside of the barrel member is formed in the brush mounting portion which is recessed with respect to the outer surface of the thread of the helicoid. Nevertheless, since the helicoid is surrounded by the thread of the helicoid, a good light interception property can be obtained.

In a conventional multi-feed type zoom lens barrel in which the thickness of the camera is reduced, the relative movement of each barrel element in the axial direction (parallel with the optical axis) is small. However, in the illustrated embodiment in which the code plate 80 extends in the circumferential direction of the first linear movement guide ring 20 which is guided to move linearly in a direction parallel with the optical axis with respect to the camera body, and the brush 70 is provided on the first outer barrel 17 which is relatively rotatable without varying the axial position relative to the first linear movement guide ring 20 so that the focal length can be detected in accordance with the amount of the relative rotation of the first linear movement guide ring 20 and the first outer barrel 17, the code plate can be elongated to increase the number of the split detection stages of the focal length, regardless of the relative movement of each barrel element in the axial direction. As can be seen in FIG. 5, the first linear movement guide ring 20 has a circumferential length longer than the axial length (in the direction parallel with the optical axis).

Moreover, it is the code plate 80 and not the brush 70 that is connected to the focal length detection circuit (included in the CPU 100). Consequently, the brush 70 can be provided with only a pair of contact terminals 71 and 72 which are adapted to selectively connect two of the electrodes provided on the code plate 80, thus resulting in a miniaturization of the brush. Furthermore, since no conductor (lead) is connected to the brush, it is possible to provide the brush 70 on the first outer barrel 17 which rotates and moves axially relative to the camera body.

The present invention is not limited to the illustrated embodiment. For instance, in the illustrated embodiment, the third outer barrel 45 which is provided with the male helicoid 46 is movable in the axial direction relative to the second linear movement guide ring 33 without relatively rotating. Therefore, in connection with the mounting structure of the brush, it is possible to adhere the code plate which is elongated in the axial direction parallel with the optical axis, to the outer surface of the second linear movement guide ring 33, wherein the brush is attached to the male helicoid 46 of the third outer barrel 45 in the above-mentioned way. In this arrangement, the direction of the extension of the contact terminals of the brush is determined taking into account the sliding contact in the axial direction. Consequently, the third outer barrel 45 and the second linear movement guide ring 33 relatively move in the axial direction during the zooming operation, so that the focal length can be detected in accordance with the sliding contact between the brush and the code plate. Namely, the first feature of the present invention that the brush is attached to the helicoid can be applied to a device other than an encoder, which detects the sliding movement in the circumferential direction. Note that since the third outer barrel 45 moves, linearly relative to the stationary barrel 13, it is possible to electrically connect not the code plate, but the brush to the focal length detection circuit of the camera body. However, from the viewpoint of miniaturization of the brush provided on the helicoid, as the width of the brush is increased if used as an electrode member, it is preferable that the code plate be used as an electrode member and that the brush form a conductor means for connecting the electrodes of the code plate.

In the illustrated embodiment, the code plate forms a part of the FPC board and is adhered to the barrel member.

Consequently, no soldering operation is necessary; thus resulting in a reduction of the manufacturing cost and facilitating assembly thereof. Alternatively, it is possible to mold the code plate together with the barrel member and thereafter connect the lead wire thereto.

As can be understood from the above discussion, according to the first feature of the present invention, a simple encoder brush mounting structure in which the brush is attached to the helicoid of the barrel member can be obtained wherein not only can the space utilization efficiency be enhanced but also a sufficient strength and a good light interception property can be obtained without increasing the size of the lens barrel.

According to the second feature of the present invention, the code pate is provided on the linearly moving barrel which is guided to linearly move relative to the camera body in the axial direction parallel with the optical axis, and the brush which is in sliding contact with the code plate is provided on the rotating barrel which rotates relative to the linearly moving barrel without varying the relative position in the axial direction when the rotating barrel is moved in the axial direction while rotating relative to the camera body. In this arrangement, since the code plate is electrically connected to the focal length detection circuit within the camera body, it is possible not only to increase the relative movement between the code plate and the brush, even in a small multi-feed type lens barrel, but also to make the brush small.

What is claimed is:

1. A brush mounting structure for an encoder in a zoom lens barrel, comprising:

a brush and a code plate operatively arranged in a zoom lens barrel, said brush and said code plate comprising an encoder which detects the focal length in accordance with a relative sliding movement between said code plate and said brush; and a first helicoid lens barrel member, of said zoom lens barrel, which is provided with a helicoid portion;

wherein said brush for detecting the focal length is provided on said helicoid portion of said first helicoid lens barrel.

2. A brush mounting structure for an encoder according to claim 1, wherein said brush is embedded in a thread of said helicoid portion.

3. A brush mounting structure for an encoder according to claim 2, wherein said thread of said helicoid portion in which said brush is embedded is wider than the width of the remaining threads of said helicoid portion formed on a cylindrical surface of said barrel member;

and wherein a second helicoid barrel member which engages with said first helicoid barrel member is provided with a wide thread which engages with said thread which is wider than the width of said remaining threads of said helicoid portion.

4. A brush mounting structure for an encoder according to claim 2, wherein said thread of said helicoid portion in which said brush is embedded is provided with a through-hole which connects the outside and inside of said first helicoid barrel member in a radial direction, and wherein said brush is provided with a contact terminal which extends through said through-hole to the surface on the side opposite to said helicoid portion so as to come into contact with said code plate.

5. A brush mounting structure for an encoder according to claim 4, wherein said thread comprises a recess for inserting said brush therein.

6. A brush mounting structure for an encoder according to claim 1, wherein said brush is secured to said first helicoid barrel member by means of a screw.

7. A brush mounting structure for an encoder according to claim 1, wherein said first helicoid barrel member on which said brush is provided is moved in a direction parallel with the optical axis when it rotates relative to a camera body in a forward or reverse direction;

said zoom lens barrel further comprises a linearly moving barrel which is rotatable relative to said first helicoid barrel member on which said brush is provided in the direction parallel with the optical axis without varying the axial relative position;

said code plate extends on said linearly moving barrel in a circumferential direction thereof; and said code plate and said brush are relatively slid in the circumferential direction in accordance with the relative rotation of said first helicoid barrel member and said linearly moving barrel.

8. A focal length detection mechanism in a zoom lens barrel, comprising:

a linearly moving barrel which is guided to linearly move relative to a camera body in a direction parallel with the optical axis;

a rotating barrel which receives therein said linearly moving barrel and which moves in the direction parallel with the optical axis relative to said camera body while relatively rotating without varying the relative position to said linearly moving barrel in the direction parallel with the optical axis when said rotating barrel rotates in a forward or reverse direction relative to said camera body;

a code plate which is provided on an outer peripheral surface of said linearly moving barrel so that the length of said code plate extends in a circumferential direction;

a connection mechanism for electrically connecting said code plate and a focal length detection circuit within said camera body; and a brush which is provided on an inner peripheral surface of said rotating barrel so as to come into contact with said code plate and which establishes an electrical connection of predetermined conductor circuit-paths provided on said code plate in a predetermined combination in accordance with the relative angular position between said linearly moving barrel and said rotating barrel.

9. A focal length detection mechanism in a zoom lens barrel according to claim 8, wherein said brush is made of a conductor provided with a pair of conductor terminals which can be brought into contact with said code plate.

10. A focal length detection mechanism in a zoom lens barrel according to claim 8, wherein said code plate is received in a code receiving groove which is formed in an outer peripheral surface of said linearly moving barrel, said groove having a depth corresponding to the thickness of said code plate, so that said code plate is substantially flush with the outer peripheral surface of said linearly moving barrel.

11. A focal length detection mechanism in a zoom lens barrel according to claim 8, wherein said code plate and said connection mechanism are integrally formed by a flexible printed circuit board.

* * * * *